United States Patent [19]

Slemp

[11] 4,008,348
[45] Feb. 15, 1977

[54] PARTICULATE AND SOLAR RADIATION STABLE COATING FOR SPACECRAFT

[75] Inventor: Wayne S. Slemp, Newport News, Va.

[73] Assignee: The United States of America as represented by the Administrator of the National Aeronautics and Space Administration, Washington, D.C.

[22] Filed: May 16, 1975

[21] Appl. No.: 578,240

Related U.S. Application Data

[63] Continuation of Ser. No. 428,992, Dec. 27, 1973, abandoned.

[52] U.S. Cl. .............................. 428/35; 428/421; 428/461; 428/474; 244/117 A; 427/160; 427/322

[51] Int. Cl.² .................. B32B 27/08; B32B 15/08; C23C 13/00; B64C 1/00

[58] Field of Search ........... 427/160, 322; 428/421, 428/461, 474, 35, 339; 126/141; 244/117 A, 158

[56] References Cited

UNITED STATES PATENTS

| | | | |
|---|---|---|---|
| 2,898,228 | 8/1959 | Kelley | 428/421 |
| 3,282,533 | 11/1966 | Spain | 244/158 |
| 3,428,473 | 2/1969 | Langley | 427/160 |
| 3,455,774 | 7/1969 | Lindsey et al. | 156/272 |
| 3,622,400 | 11/1971 | Lauriente et al. | 244/158 X |
| 3,627,624 | 12/1971 | Kreuz | 428/339 |
| 3,676,566 | 7/1972 | McBride | 174/36 |
| 3,702,788 | 11/1972 | Haller | 428/461 |

*Primary Examiner*—Philip Dier
*Attorney, Agent, or Firm*—Howard J. Osborn; Wallace J. Nelson; John R. Manning

[57] ABSTRACT

A laminate thermal control coating for spacecraft comprising a layer of solar-radiation stable film, a layer of particulate-radiation stable film applied to the upper surface of the solar-radiation stable film, and a layer of reflecting material applied to the lower surface of the solar-radiation stable film. The coating experiences no increase in solar radiation absorptance (the proportion of radiant energy absorbed) upon exposure to particular or solar radiation as the particulate radiation is substantially absorbed in the particulate-radiation stable layer and the solar radiation partially absorbed by the particulate-radiation stable layer is transmitted by the solar-radiation stable film to the reflecting material which reflects it back through the laminate and into space.

6 Claims, 3 Drawing Figures

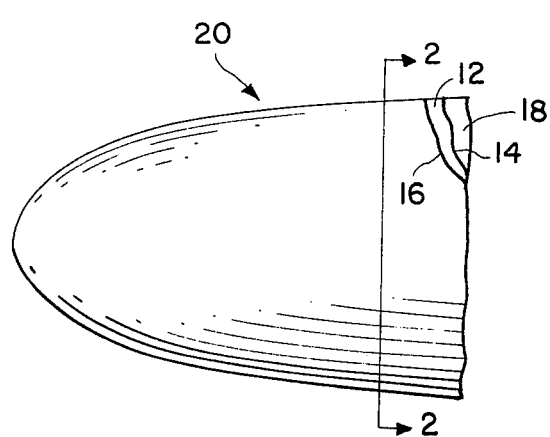
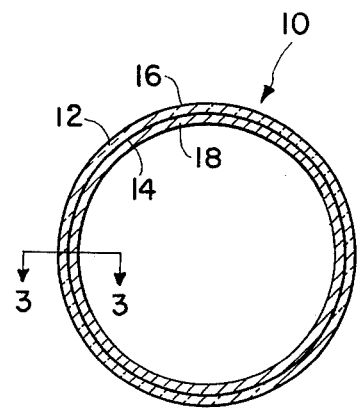
FIG. 1  FIG. 2
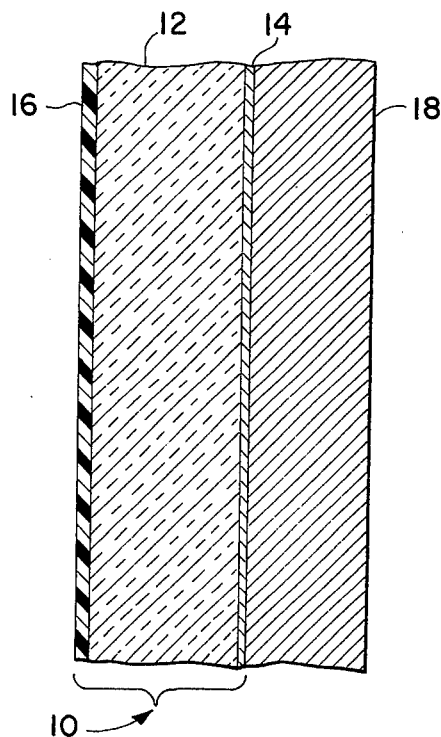
FIG. 3

PARTICULATE AND SOLAR RADIATION STABLE COATING FOR SPACECRAFT

ORIGIN OF THE INVENTION

The invention herein described was made by an employee of the United States Government and may be manufactured and used by or for the Government for governmental purposes without the payment of any royalties thereon or therefor.

RELATED APPLICATION

This application is a continuation of application Ser. No. 428,992, filed Dec. 27, 1973 and now abandoned.

BACKGROUND OF THE INVENTION

The invention relates generally to spacecraft coatings and more particularly to a thermal control coating which maintains spacecraft temperature balance under extended exposure to both particulate and solar radiation.

Control of the temperature of a spacecraft operating in space has become a serious problem due to the damaging effects of solar radiation on coatings used to regulate the spacecraft temperature. Since the temperature of a spacecraft in space is a function of solar radiation absorptance of the coatings used on the exterior of the spacecraft, any change in solar radiation absorptance of the coating will change the equilibrium temperature of the spacecraft. Reflecting coatings, such as white paints, have the desired solar radiation absorptance when initially applied to the spacecraft, but after a brief exposure to the space solar-radiation environment, the solar radiation absorptance increases and this increases the spacecraft temperature. To further compound this problem, spacecraft operating within or outside the Van Allen radiation belts are also exposed to particulate radiation in the form of protons, electrons and other charged particles, which substantially darken the white paints and causes a very rapid and substantial increase in the solar radiation absorptance of these paints rendering them useless for maintaining the temperature of a spacecraft within desired operational limits. Further, extended exposure to particulate radiation affects the physical properties of the coating causing it to become brittle and flake-off. It is therefore apparent that the darkening and flaking-off of the coatings caused by exposure to particulate radiation, presents serious obstacles to maintaining the thermal balance of operating spacecraft.

Other spacecraft thermal control coatings have been developed which use metallized reflecting films, but tests have shown that these films, when exposed to particulate radiation, are also subject to the same effects of increasing solar radiation absorptance (darkening) and embrittlement as the reflective paints.

Thus, there has been demonstrated a definite need for a new thermal coating which maintains a thermal balance in a spacecraft even under extended exposure to particulate and solar radiation. Accordingly, it is an object of the present invention to provide a thermal control coating which does not become brittle upon extended exposure to particulate radiation.

Another object of the present invention is to provide a new thermal control coating which does not darken upon extended exposure to solar radiation.

Still another object of the present invention is to provide a new thermal control coating which maintains a thermal balance in a spacecraft upon extended exposure to particulate and solar radiation.

SUMMARY

The foregoing and other objects are attainable by providing a laminate coating comprised of a transparent, solar-radiation stable film, a mirror reflecting metal deposited on the bottom surface of the transparent film, and a thin, highly particulate radiation stable coating applied to the top surface of the transparent film.

In a coating such as that described above, the highly particulate-radiation stable coating absorbs substantially all of the particulate radiation without darkening. Also, since almost all of the particulate radiation is absorbed in this stable coating, the particles are prevented from reaching the transparent film to degradate or darken it.

However, such particulate-radiation stable coatings are naturally highly colored and naturally absorb a distinct amount of solar radiation. If the laminate coating were composed entirely of this type of material, it would have a very high solar radiation absorptance and would not be useful for spacecraft temperature control.

This natural solar radiation absorptance of the particulate-radiation stable coating is minimized by combining the particulate-radiation stable coating with the highly transparent solar-radiation stable film and the mirror reflecting metal deposited thereon. Most of the solar radiation passes easily through both the particulate radiation stable coating and the highly transparent solar-radiation stable film. When it reaches the mirror reflecting surface, it is reflected back through both of the layers and into space. As most of this solar radiation is reflected from the laminate coating, there is substantially no increase in solar radiation absorptance due to the natural coloring of the particulate-radiation stable coating.

The thickness of the particulate-radiation stable coating can be varied to correspond to the depth of penetration of the various types of particulate radiation to be encountered by the spacecraft. Also, it will be readily apparent that the coloration, transparency, thickness and reflectivity of the layers in the laminate may be varied to achieve a value of particulate and solar radiation absorptance necessary to maintain spacecraft thermal balance for the known operation conditions of the craft.

BRIEF DESCRIPTION OF THE DRAWINGS

A more complete appreciation of the present invention and many of the attendant advantages thereof will be readily appreciated as the same becomes better understood by reference to the following detailed description when considered in connection with the accompanying drawings, wherein:

FIG. 1 is a view of an exemplary space vehicle, with parts omitted and parts in section, employing a thermal control coating according to the present invention;

FIG. 2 is a section taken along line 2—2 of FIG. 1, and

FIG. 3 is a section taken along line 3—3 of FIG. 2.

DETAILED DESCRIPTION

Referring now to the drawings and more particularly to FIG. 3, there is shown a sectional view along line 3—3 of FIG. 2 of the laminate thermal control coating according to the present invention and generally designated by reference numeral 10.

Laminate coating 10 includes a transparent solar radiation stable film 12; a substratum 14 of a layer of reflecting material deposited on the undersurface of film 12 and a superstratum 16 of a layer of particulate radiation stable coating fused to the top surface of stable film 12.

In the embodiments of the present invention chosen for illustration, particulate-radiation stable coating 16 is a polyimide or an aromatic-heterocyclic polymer having a thickness of between 0.25 to 0.07 mils. Solar radiation stable film 12 is a polymeric film such as, for example, a perfluorinated ethylenepropylene copolymer having a thickness of between 0.50 to 5.0 mils and emittance values between 0.40 and 0.85. The reflecting material of substratum 14 is generally a reflecting metal such as aluminum, silver, gold or copper, vapor-deposited on the undersurface of solar radiation stable film 12.

The choice of materials and thicknesses is determined according to the particular thermal requirements of the spacecraft, as will be set out below.

Substratum 14 of laminate coating 10 is affixed to the outer mainwall 18 of a spacecraft 20 by suitable means such as, for example, an adhesive bonding agent.

In a specific example of the thermal control coating of the present invention, film 12 is 5.0 mils thickness perfluorinated ethylene-propylene available under the trade name of FEP Teflon from the E. I. DuPont de Nemours & Company, Inc., of Wilmington, Delaware. Coating 16 is poly-[N,N'-[p,p'-oxydiphenylene]-pyromellitimide] 0.15 mils thick and heat-fused onto coating 12 at 35 p.s.i. and at 550° F. ± 25° for 10 minutes ±2. Coating 16 is available under the trade name of Kapton, a polyimide film Type H, also available from E. I. DuPont de Nemours & Company, Inc., of Wilmington, Delaware. Substratum 14 is a 1500 A thick layer of silver vapor deposited on the undersurface of film 12.

OPERATION

Spacecraft 20, orbiting in space, is exposed to solar radiation and is bombarded by particulate radiation in the order of $10^8$ particles/cm²-sec. Particulate radiation includes protons, electrons and other charged atomic particles.

As spacecraft 20 is bombarded by this particulate radiation, particulate radiation stable coating 16 absorbs substantially all of the particles so that few reach film 12 to darken it. As coating 16 is particulate-radiation stable, it does not darken from this particulate radiation beyond its natural dark coloring and thus its own solar radiation absorptance does not increase. However, coating 16 does absorb a natural distinct amount of solar radiation due to its natural dark coloring. Thus, neither coating 16 nor film 12 experiences any increase in solar radiation absorptance due to particulate radiation bombardment.

In laminate coating 10, the solar radiation naturally absorbed by dark coating 16 passes directly into transparent solar radiation stable film 12. The solar radiation travels through film 12 to mirror reflecting metal 14 and is reflected back through film 12 and coating 16 into space. Because of the high transparency of film 12, the reflectivity of metal 14 and the thinness of coating 16, the increase in solar radiation absorptance and in spacecraft temperature due to the natural dark coloring of coating 16 is almost negligible.

Thus, as a result of forming a laminate thermal coating comprised of layers of a particulate-radiation stable material; a transparent solar-radiation stable material; and a reflecting material, the solar radiation absorptance of a spacecraft due to particulate and solar radiation can be controlled and its temperature maintained.

What is claimed as new and desired to be secured by Letters Patent of the United States is:

1. In combination:
   1. an enclosure and
   2. a thermal control coating for said enclosure serving to maintain temperature balance within said enclosure under extended exposure to both particulate and solar radiation,
   said enclosure serving as a substrate and said thermal control coating being applied to the substrate and including
      a. a layer of a solar-radiation stable film having a lower and an upper surface;
      b. a superstratum of a particulate-radiation stable film applied to the upper surface of said solar-radiation stable film; and
      c. a substratum of a reflecting material applied to the lower surface of said solar radiation stable film, the reflective surface of said substratum being disposed such that solar radiation passing through said superstratum and said solar radiation stable film strikes the reflective surface of said substratum and is reflected back towards said solar radiation stable film and said substratum.

2. The combination of claim 1 wherein said (particulate)-radiation stable film is poly-[N,N'[p,p'-oxydiphenylene]pyromellitimide].

3. The combination of claim 1 wherein the particulate-radiation stable coating is a polyimide.

4. The combination of claim 1 wherein the solar radiation stable coating is perfluorinated ethylene-propylene.

5. The combination of claim 1 wherein the reflecting material is a metal selected from the group consisting of aluminum, silver, gold and copper.

6. A thermal coating for a substrate which experiences no increase in solar radiation absorptance upon exposure to particulate or solar radiation, comprising:
   a layer of perfluorinated ethylene-propylene and having an upper and a lower surface;
   a superstratum of poly-[N,N'-[p,p'-oxydiphenylene]pyromellitimide] applied to the upper surface of said layer of perfluorinated ethylene-propylene; and
   a reflective substratum of silver applied to the lower surface of said layer of perfluorinated ethylene-propylene, the reflective surface thereof being disposed toward the lower surface of said layer of perfluorinated ethylene-propylene,
   said silver substratum being bonded to the substrate.

* * * * *